United States Patent
Takahashi

Patent Number: 6,144,782
Date of Patent: Nov. 7, 2000

[54] N×2N OPTICAL FIBER SWITCH

[75] Inventor: Mitsuo Takahashi, Matsudo, Japan

[73] Assignee: Seikoh Giken Co., Ltd., Matsudo, Japan

[21] Appl. No.: 09/166,294

[22] Filed: Oct. 5, 1998

[30] Foreign Application Priority Data

May 29, 1998 [JP] Japan .................................. 10-149593

[51] Int. Cl.⁷ .................................................. G02B 6/35
[52] U.S. Cl. .................................. 385/20; 385/21; 385/22
[58] Field of Search ................................ 385/20, 21, 22, 385/17, 52

[56] References Cited

U.S. PATENT DOCUMENTS

| | | |
|---|---|---|
| 4,407,562 | 10/1983 | Young . |
| 4,834,488 | 5/1989 | Lee . |
| 5,434,936 | 7/1995 | Nagaoka et al. . |
| 5,727,099 | 3/1998 | Harman ..................................... 385/52 |

FOREIGN PATENT DOCUMENTS 0 530 927  3/1993  European Pat. Off. .

*Primary Examiner*—John D. Lee
*Assistant Examiner*—Sarah N Song
*Attorney, Agent, or Firm*—Venable; Robert J. Frank; Gabor J. Kelemen

[57] ABSTRACT

An optical fiber switch for switching N×2N (N≧1) circuits is capable of mechanically switching a plurality of pairs of optical fiber circuits at the same time. The optical fiber switch moves an N (N≧1) number of movable optical fibers at the same time by a drive member which is guided by a slit of alignment members and reciprocated at right angles or in the X direction with respect to an optical axis. The optical axes of the movable optical fibers are accurately aligned with the optical axes of first or second fixed optical fibers by a mechanism which presses the N (N≧1) number of the movable optical fibers against alignment V grooves at the same time by utilizing the flexure stress of an elastic pin provided on an actuator. Further, the elastic pin imparts a self-holding function to the actuator.

8 Claims, 8 Drawing Sheets

A~A

B~B $\psi = 180° \div 2\alpha°$ $F = W \tan \alpha$

1 × 2 Switch

2 × 4 Switch

4 × 8 Switch

N×2N OPTICAL FIBER SWITCH

BACKGROUND OF THE INVENTION

1. Field of the Invention

The present invention relates to an optical fiber switch used for an optical fiber communications system or the like. More particularly, it relates to an N×2N (N≧1) optical fiber switch capable of driving optical fibers so as to mechanically switch a plurality of pairs of optical fiber circuits repeatedly by small electric power. The present invention also relates to an actuator equipped with a self-holding function so that it does not require constant supply of current except at the time of the aforesaid switching for which it momentarily requires a pulse current.

2. Description of the Related Art

There has been proposed an optical fiber switch adapted to directly or indirectly move optical fibers. An optical fiber switch, in which an optical fiber is the only major movable part thereof, is advantageous in that it enables relatively quick switching because it requires an extremely short operating distance and the mass of the movable part is extremely small. On the other hand, it is disadvantageous in that it may damage an optical fiber because it drives a fragile quartz glass optical fiber itself located on the moving side to perform switching.

There has also been a technical task of precisely aligning the optical axes of movable optical fibers with those of fixed optical fibers.

The optical fiber switch disclosed under U.S. Pat. No. 5,434,936 is a 1×2 circuit changeover switch which makes use of magnetism to drive a movable optical fiber. A 2×2 circuit cross switch disclosed under U.S. Pat. No. 4,834,488 employs a mechanical actuator incorporating a solenoid coil for driving a movable optical fiber. FIGS. 6A through 6D are schematic drawings illustrative of the operation of an optical fiber type optical fiber switch of a 1×2 circuit changeover switch, which is comprised of optical fibers, disclosed in U.S. Pat. No. 5,434,936. FIGS. 6A through 6C are top plan views, and FIG. 6D is side sectional view.

Referring to FIGS. 6A through 6D, fixed optical fibers 31 and 32 are adhesively fixed on the bottoms of V grooves 35 and 36, which are respectively formed in the surfaces of a pair of members 33 and 34, in such a manner that the distal end surfaces thereof are aligned. The distal end surfaces of the fixed optical fibers 31 and 32 are positioned so that they are retreated from the left end surfaces of the pair of members 33 and 34.

A movable optical fiber 37 is supported by and fixed to a fixing member 38, the outer surface of the movable optical fiber 37 being coated with a film made of a magnetic material. In a magnetic field of a permanent magnet, the portion coated by the film made of the magnetic material is driven and displaced toward the fixed optical fibers 31 and 32 alternately by changing the magnetic field by a solenoid coil. This causes the movable optical fiber 37 to shuttle in the space to be coupled to the fixed optical fibers 31 and 32 alternately.

In the case of a single-mode optical fiber, a misalignment of 2 μm in optical axis leads to an insertion loss of about 0.86 dB or an optical loss of about 18%. To reduce the insertion loss, therefore, the movable optical fiber 37 must be stopped in contact with the V grooves with its optical axis accurately aligned with the optical axes of the fixed optical fibers 31 and 32. In the optical fiber switch constituted by employing optical fibers, the optical axis of the movable optical fiber 37 can be aligned with the optical axis of the fixed optical fiber 31 only when an appropriate driving force W is applied as indicated by a white arrow in FIG. 6A. However, if the driving force W is insufficient as illustrated in FIG. 6B, the distal end of the movable optical fiber 37 is improperly positioned and cannot reach the V groove 35. Conversely, if the driving force W is excessive, then the portion in the vicinity of the distal end of the movable optical fiber 37 bumps against an edge of the V groove 35 and the distal end of the movable optical fiber 37 is positioned above the V groove 35, thus preventing the optical axis of the movable optical fiber 37 from being aligned with the optical axis of the fixed optical fiber 31. If it is assumed that the permissible displacement of the distal end of the movable optical fiber 37 is 1 μm, it is presumed that accomplishing subtle control of the driving force W to respond to such a minute displacement is hardly possible.

A description will now be made of the 2×2 circuit cross switch which employs a mechanical actuator rotated by a solenoid coil to drive a movable optical fiber and which has been disclosed under U.S. Pat. No. 4,834,488. The switch has no alignment means such as a V groove wherein the movable optical fiber is engaged with a fixed optical fiber, presenting doubts about the accuracy in the alignment of the optical axes of the respective optical fibers. Hence, in these conventional examples, the technique for aligning the optical axis of the movable optical fiber with the optical axis of the fixed optical fiber with good reproducibility is imperfect, posing a problem to be solved when constituting an optical fiber switch employing optical fibers.

Optical fiber switches are required to provide improved coupling performance achievable by a reduction in the aforesaid optical insertion loss and to also provide the self-holding feature that enables a coupling position to be secured without the need for the constant supply of current. More specifically, optical fiber switches are required to be able to momentarily flow a pulse current only at the time of circuit switching to hold the coupling between the movable optical fiber and one of the fixed optical fibers. The 2×2 circuit cross switch disclosed under U.S. Pat. No. 4,834,488 requires constant supply of current. The optical fiber type optical fiber switch of the 1×2 circuit changeover switch constructed using optical fibers (disclosed in U.S. Pat. No. 5,434,936) is the self-holding type; however, the movable optical fiber 37 having its outer surface coated with the film made of a magnetic material is inherently susceptible to magnetic force. Hence, this switch is presumed to have a difficulty in the reliability of the self-holding performance if it is subjected to an external magnetic field or impact.

Because of the reasons set forth above, it is difficult to implement an optical fiber switch, which is capable of switching a plurality of optical fibers at the same time, by utilizing the structural principles of the optical fiber switches of the prior art examples described above. To achieve an optical fiber switch that permits switching of a plurality of optical fibers at the same time, it is required to minimize the insertion losses of all pairs by accurately aligning the optical axes of all matching pairs of movable optical fibers and fixed optical fibers. It is also required to provide reliable self-holding feature so as to achieve higher reliability of switching operation.

SUMMARY OF THE INVENTION

Accordingly, it is an object to solve the technical problems described above, and, to provide an optical fiber switch for switching N×2N (N≧1) circuits, which is capable of mechanically switching a plurality of pairs of optical fiber circuits at the same time.

It is another object of the present invention to provide an optical fiber switch for switching N×2N (N≧1) circuits, which is equipped with: a mechanism for moving and displacing an N (N≧1) number of movable optical fibers at the same time by a drive member which is guided by a slit to alternately reciprocate perpendicularly or in the direction of (X) with respect to an optical axis (Z); a mechanism for precisely aligning the optical axes of the movable optical fibers and the fixed optical fibers by using a mechanism which presses an N (N≧1) number of movable optical fibers against an alignment V groove at the same time by making use of the flexure stress of an elastic pin provided on an actuator; and a reliable self-holding function by using the elastic pin.

In order to achieve the above objects, an N×2N optical fiber switch is provided in accordance with the present invention comprising, an alignment member main body which has an N ((N≧1) number of pairs of V grooves provided in parallel to a Z-axis and aligned in a Y direction and which has a single slit crossing said V grooves in an X direction, a 2N number of fixed optical fibers disposed in contact with the bottoms of said respective V grooves, an N number of movable optical fibers which are provided so that the distal ends thereof are opposed to said fixed optical fibers and that they may be in contact with either of pairs of V grooves, a drive member, which is inserted in said slit, which engages with said N number of movable optical fibers, and which is movably guided in the X direction, and an actuator which engages with said drive member so that it is elastically joined to said drive member to reciprocate said drive member in order to cause said N number of movable optical fibers to come in contact with one of said pairs of grooves so as to move them to a first position where they are coupled to one N number of said 2N number of fixed optical fibers, and to cause said N number of movable optical fibers to come in contact with the other of said pairs of grooves so as to move them to a second position where they are coupled to the other N number of said 2N number of fixed optical fibers.

The alignment member main body comprises a first alignment member and a second alignment member which are joined and which are separately provided with a 2N number of pairs of V grooves, and the constituent material of said respective alignment members is cemented carbide.

The actuator comprises a motor and an elastic pin which is eccentrically provided on an end surface of a cylindrical member mounted on an distal end of the shaft of said motor, which is composed of an elastic material and has an extremely small diameter, said elastic pin is inserted in a slit provided in said drive member, and said drive member is moved forward or backward in the X direction by running said motor in the forward or reverse direction so as to reciprocate said movable optical fibers between said first position and said second position.

The actuator further comprises a rotational position restricting member which restricts a rotational range of said motor defined by a value that exceeds 180 degrees but stays below 270 degrees, and moves the distal ends of said movable optical fibers between said first position and said second position by running said motor in a forward or reverse direction within said rotational range.

If a rotational radius of an elastic pin of said motor is denoted as R and a distance between said first position and said second position is denoted as S, then a relationship 2R>S is established.

The rotational angle restricting member is provided with a permanent magnet for attracting said elastic pin.

It is constructed that the actuator is a latching solenoid.

The distal end surfaces of said movable optical fibers and said fixed optical fibers are formed into inclined surfaces of 4 degrees or more with respect to a surface perpendicular to an optical axis.

DESCRIPTION OF THE PREFERRED EMBODIMENT

An embodiment of the optical fiber switch in accordance with the present invention will be described in detail with reference primarily to the accompanying drawings.

FIGS. 1A through 1F show an optical fiber switch main body and a drive member of the embodiment of an N×2N (N=4) optical fiber switch in accordance with the present invention.

Figure 1A:
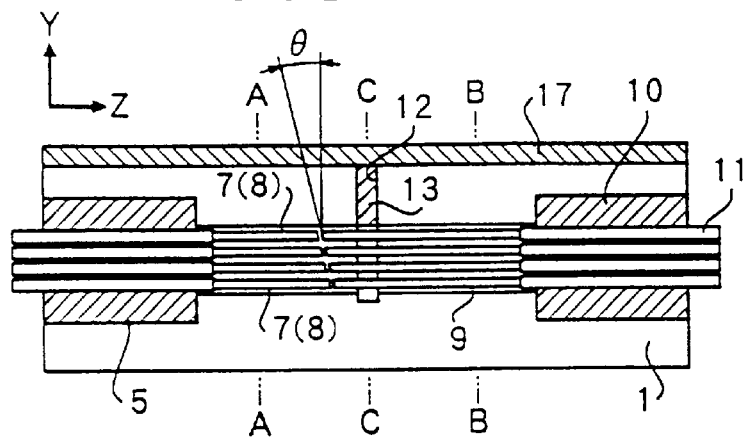
FIG. 1A is a front sectional view of an embodiment of the main body of an N×2N optical fiber switch in accordance with the present invention.

FIG. 1A is a front sectional view of the embodiment of the main body of the N×2N (N=4) optical fiber switch in accordance with the present invention.

Figure 1B:
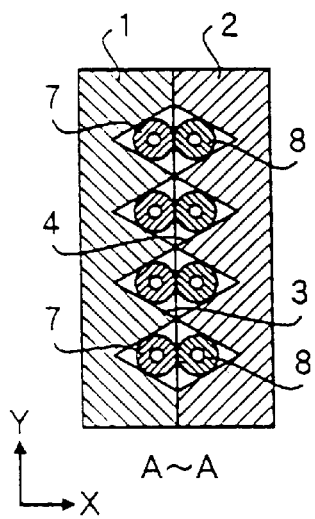
FIG. 1B shows a side sectional view of the embodiment at the line A—A.
Figure 1C:
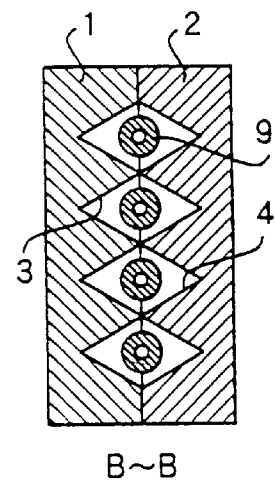
FIG. 1C shows a side sectional view of the embodiment at the line B—B.
Figure 1D:
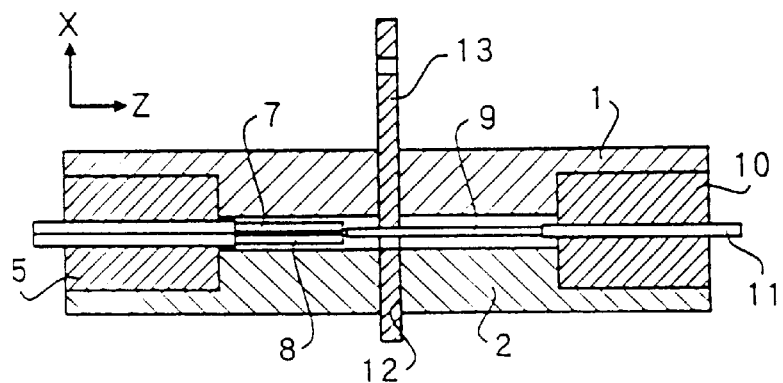
FIG. 1D is a top sectional view of the embodiment.
Figure 1E:
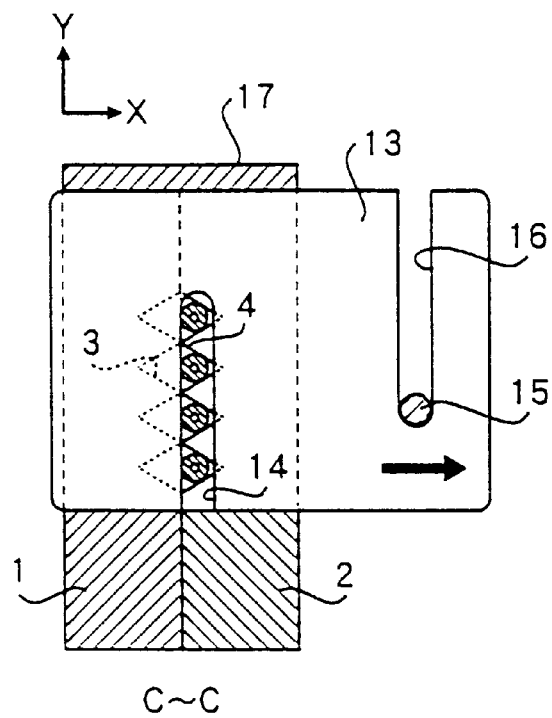
FIG. 1E is a side sectional view illustrative of the embodiment in a coupled state.
Figure 1F:
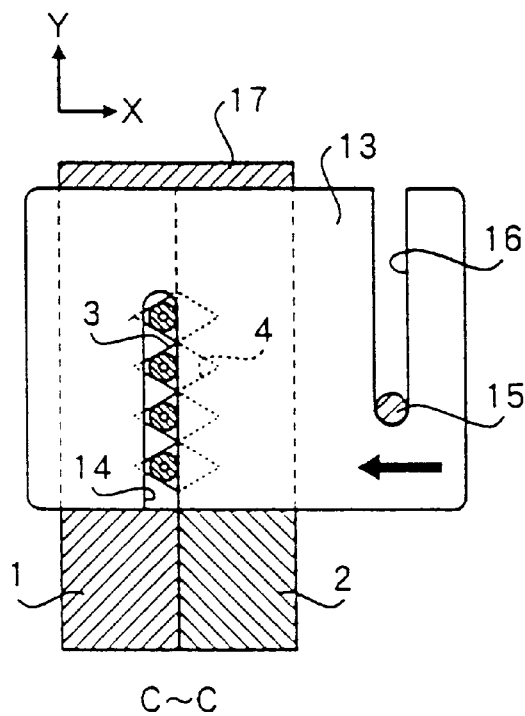
FIG. 1F is a side sectional view illustrative of the embodiment in another coupled state.

FIGS. 1B and 1C show side sectional views of the embodiment at the lines A—A and B—B, respectively; FIG. 1D is a top sectional view of the embodiment, wherein a movable optical fiber is located in a neutral position; FIG. 1E is a side sectional view illustrative of the embodiment in a coupled state; and FIG. 1F is a side sectional view illustrative of the embodiment in another coupled state.

The N×2N optical fiber switch in accordance with the present invention is provided with parallel V grooves 3, . . . 3 and 4, . . . 4 for aligning an N number (N=4) of optical fibers. The parallel V grooves are formed in the opposed surfaces in the longitudinal direction (Z) of a first rectangular alignment member 1 and a second rectangular alignment member 2. As it will be discussed later, the alignment members 1 and 2 are joined facing each other with the fixed and movable optical fibers arranged in a rhombic space formed by the respective parallel V grooves 3, . . . 3, and 4, . . . 4. A single slit 12 is provided in a lateral direction (X) so that it crosses the V grooves 3, . . . 3, and 4, . . . 4.

As shown in FIG. 1B, first fixed optical fibers 7, . . . 7 are bonded in the same space of the alignment V grooves 3, . . . 3 and second fixed optical fibers 8, . . . 8 are also bonded in the same space of the alignment V grooves 4, . . . 4, the height thereof being aligned, from one end (the left end in FIG. 1A) of the first alignment member 1 and the second alignment member 2. The sheathed portions of the fixed optical fibers 7, . . . 7, and 8, . . . 8 are supported by a mounting flange 5.

As shown in FIG. 1C, the distal ends of the movable optical fibers 9, . . . 9 are disposed at the center of the rhombic space formed by the alignment V grooves 3, . . . 3 and the alignment V grooves 4, . . . 4 from the other ends (the right end in FIG. 1A) of the first alignment member 1 and the second alignment member 2. The sheathed portions of the movable optical fibers 9, . . . 9 are supported by a mounting flange 10 of the movable side.

A drive member 13 is guided by the slit 12, which is provided in the foregoing X direction of the alignment members 1 and 2, so that it may reciprocate in the X direction. The slit 12 has a width of 1 mm or less; it receives the drive member 13 and guides it in a direction (X) perpendicular to an optical axis (Z).

The drive member 13 has slit grooves 14 and 16 as illustrated in FIGS. 1E and 1F, and the distal ends of the movable optical fibers 9, . . . 9 are inserted in the slit groove 14. An elastic pin 15 of an actuator, which will be discussed later, is engaged with the other groove 16. The drive member 13 is driven so as to elastically press the portions near the distal ends of the movable optical fibers against the aligning reference surfaces of the first fixed optical fibers and the second fixed optical fibers alternately with a predetermined pressing force. A guide cover 17 for preventing the drive member 13 from coming off is provided; it is fixed to the top surfaces of the alignment members 1 and 2 by bonding or screwing.

FIG. 1E is a diagram illustrating a state wherein the drive member 13 has been displaced to the right as indicated by the black arrow. In this case, the drive member 13 is driven by the elastic pin 15, and as the drive member 13 is displaced, the four movable optical fibers 9 are moved to the right by the slit groove 14 until they come in contact with and are pressed against the surfaces of the V grooves 4 of the alignment member 2 and stop.

FIG. 1F is a diagram illustrating a state wherein the drive member 13 has been displaced to the left as indicated by the black arrow. In this case, as the drive member 13 is displaced, the four movable optical fibers 9 are moved to the left by the slit groove 14 until they come in contact with and are pressed against the surfaces of the V grooves 3 of the alignment member 1 and stop. The alignment members 1 and 2 employ a cemented carbide material to ensure higher machining accuracy and also to provide sufficiently high wear resistance to the repeated contact of the movable optical fibers.

Figure 2A:
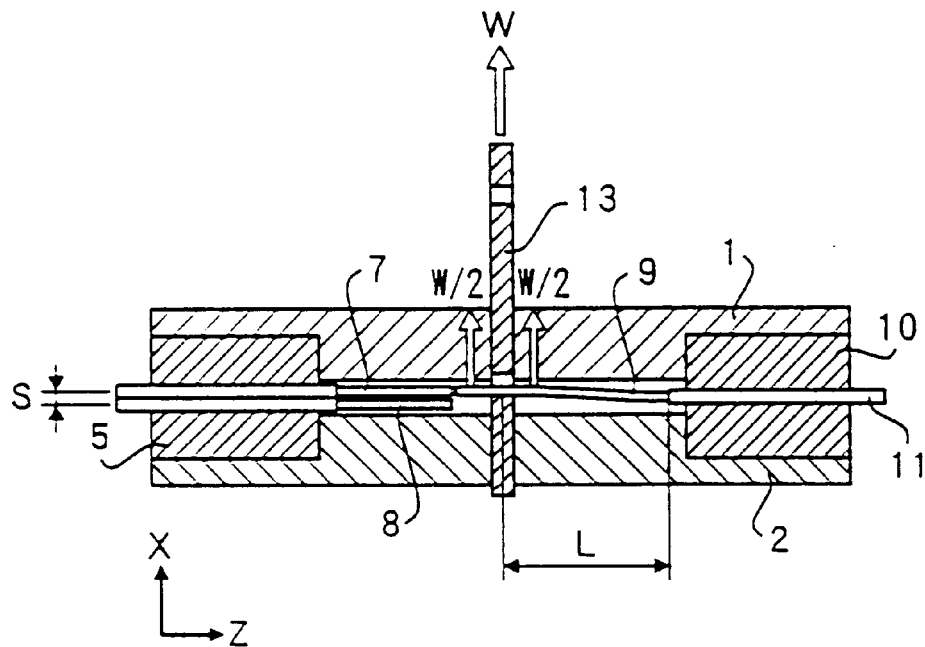
FIG. 2A is a top sectional view illustrative of a first coupling position of the embodiment.
Figure 2B:
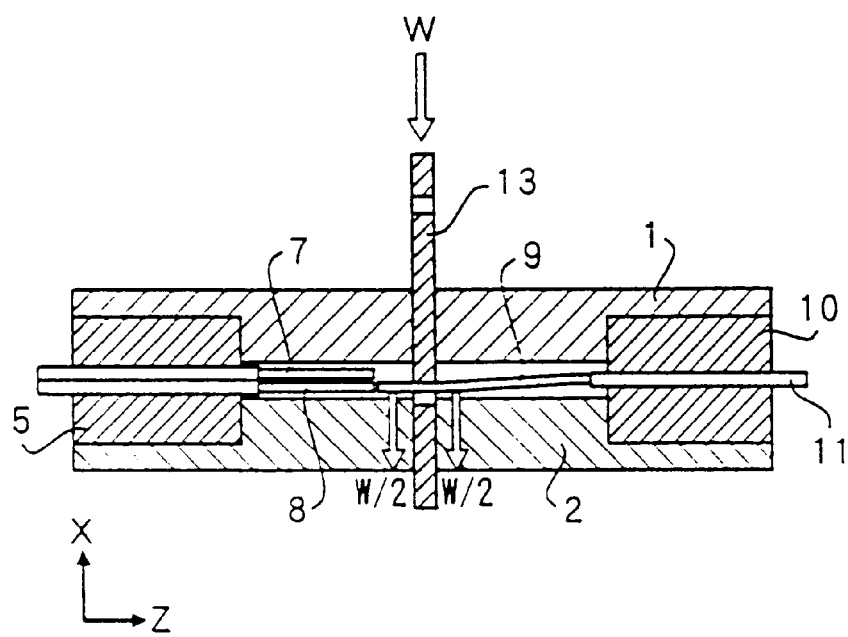
FIG. 2B is a top sectional view illustrative of a second coupling position of the embodiment.

FIGS. 2A and 2B are schematic representations illustrative of the principle regarding the driving mechanism and the push-to-align mechanism by the drive member 13 for the movable optical fibers 9, . . . 9 according to the embodiment of the N×2N (N=4) optical fiber switch shown in FIGS. 1A through 1F.

FIG. 2A illustrates a state wherein the movable optical fibers 9, . . . 9 have been lightly pressed against the V grooves of the alignment member 1 and opposed to and connected with the first fixed optical fibers 7, . . . 7. FIG. 2B illustrates a state wherein the movable optical fibers 9, . . . 9 have been lightly pressed against the V grooves of the alignment member 2 and opposed to and connected with the second fixed optical fibers 8, . . . 8.

The movable optical fibers 9, . . . 9 are inserted and installed from the other ends of the alignment members 1 and 2 so that the distal ends thereof are aligned and that they provide a gap of 10 μm or less between themselves and the distal ends of the fixed optical fibers 7 and 8. The distal ends of the optical fibers 7, 8, and 9 are polished in advance so as to form them into inclined surfaces having an angle of θ degrees (where θ>4 degrees) with respect to the surface perpendicular to the optical axis in order to reduce the light that reflects and returns (see FIG. 1A).

As set forth above, if the driving force W for bringing the movable optical fibers 9 into close contact with the V grooves 3 and 4 is excessive, then the movable optical fibers 9 are damaged by shearing. On the other hand, if the driving force W is insufficient, then incomplete close contact results. Accordingly, in order to obtain an appropriate driving force W, the N×2N optical fiber switch in accordance with the present invention is constructed so that the actuator and the drive member 13, which drives the movable optical fibers 9, . . . 9, are connected with an elastic pin to make use of the elastic force generated by the flexure deformation of the elastic pin. The elastic pin serves also as an element of the mechanism for generating the self-holding force of the actuator.

Figure 3A:
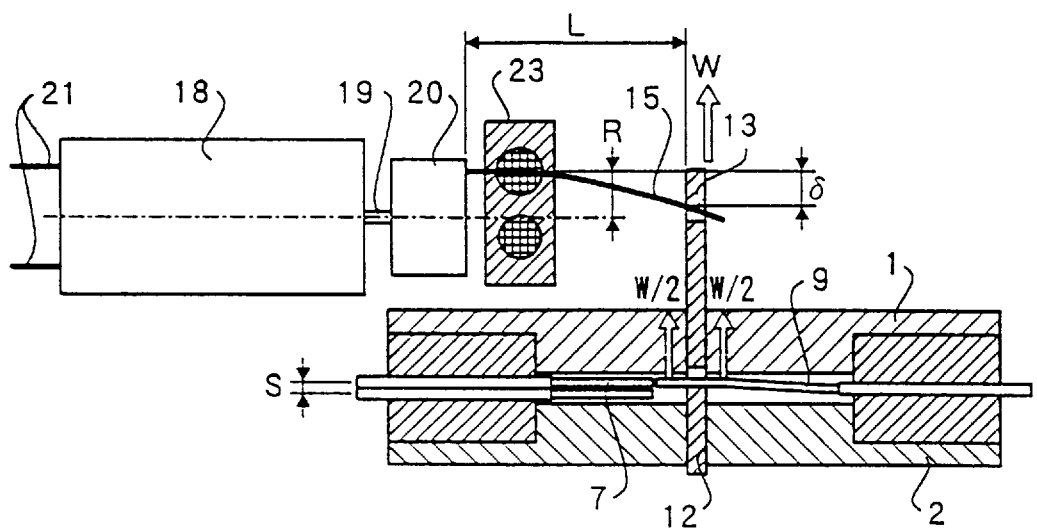
FIG. 3A is a top plan view illustrative of the relationship with an actuator at the first coupling position of the embodiment.
Figure 3B:
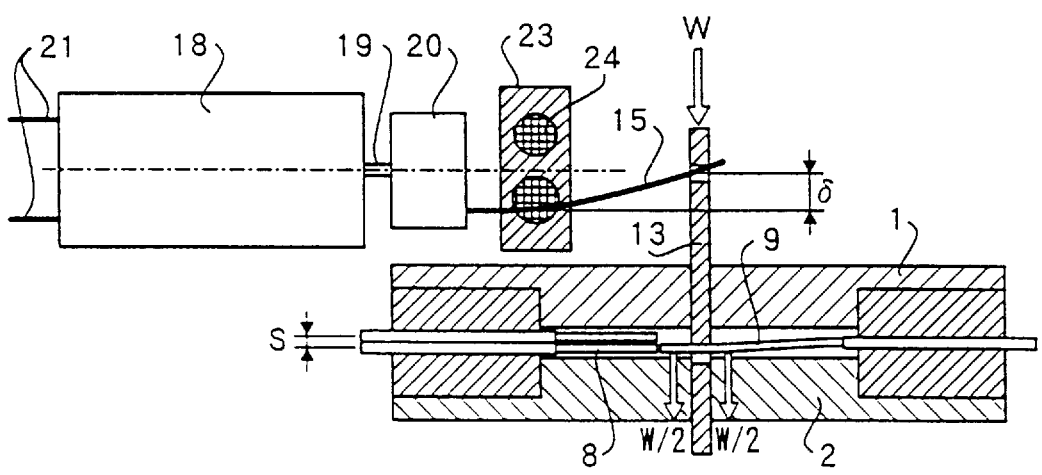
FIG. 3B is a top plan view illustrative of the relationship with an actuator at the second coupling position of the embodiment.
Figure 3C:
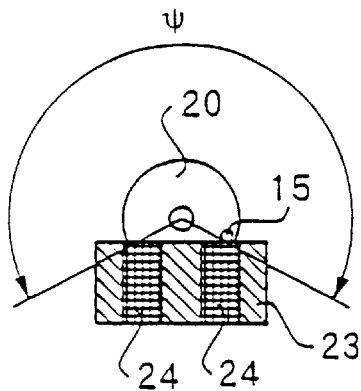
FIG. 3C is a side view showing the embodiment in the first coupling position.
Figure 3D:
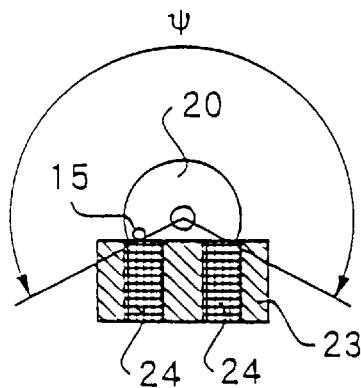
FIG. 3D is a side view showing the embodiment in the second coupling position.

FIG. 3A shows a state wherein the drive member 13 has been displaced upward, causing the movable optical fibers 9 to be coupled to the fixed optical fibers 7. A bushing 20 has been press-fitted onto the distal end of a rotary shaft 19 of a small coreless motor 18. Electric power is supplied to the small coreless motor 18 through an electric terminal 21. The bushing 20 is provided with an elastic pin 15 which has a diameter of 0.2 mm and which is eccentrically installed. For the elastic pin 15, a piano wire or the like may be used. The rotational angle of the bushing 20 is restricted by a rotational angle restricting member 23 which has permanent magnets 24 buried therein. When a relationship 2R>S is established between a rotational radius R of the elastic pin 15 and a moving stroke S of the movable optical fibers 9, the elastic pin 15 flexibly deforms as illustrated when the coreless motor 18 is rotated to cause the elastic pin 15 to come in contact with the rotational angle restricting member 23 and stop.

If the deformation is denoted as σ, then σ=R−(S/2). The force W corresponding to this deformation σ is applied to the drive member 13. The force W can be obtained by the following formula.

$$W = 3EI\sigma/L^3$$

where E: Young's modulus of the elastic pin
(≈22,000 kgf/mm²)
I: Section modulus of the elastic pin
(≈7.85×10⁻⁵/φ0.2 mm)
L: Length of the elastic pin (5 mm)

Calculation according to the above formula using the parenthesized values gives W=0.041σ(kgf). Accordingly, W=0.41 gf for each σ=0.1 mm.

The required contact force for four movable optical fibers is approximately 12 gf; therefore, the required flexure a of an elastic pin 21 will be approximately 0.3 mm.

Figure 3E:
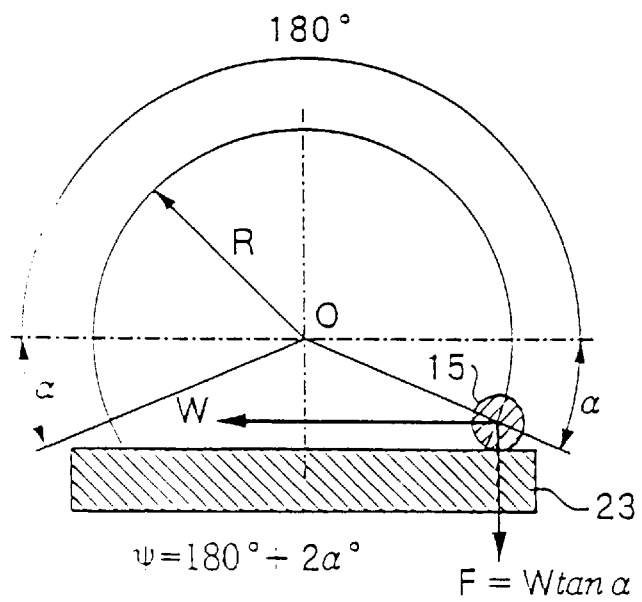
FIG. 3E is a schematic representation of a mechanism that generates a self-holding force F of a drive member.

FIG. 3E is a schematic representation illustrative of the mechanism for generating the self-holding force F of the drive member 13 in a state where the drive member 13 has been displaced to the right and the movable optical fibers 9 have been coupled to the fixed optical fibers 7. The force W applied to the drive member 13 by the flexure σ of the elastic pin 15 has been set forth above. The self-holding force F can be generated by utilizing the force W as described below.

Referring to FIG. 3E, when a rotational angle ψ of the elastic pin 15 is set to 180 degrees plus 2α (0 degree<α<30 degrees), the force calculated by F=Wtanα based on the force W applied to the drive member 13 from the flexure σ of the elastic pin 15 is generated as a component force that presses the elastic pin 15 against the rotational angle restricting member 23. For instance, if W=12 gf and α=30 degrees, then the component force F is about 6.9 gf. Experiments have revealed that the motor does not reverse under this condition.

Further, the permanent magnets 24 have been buried in the contact portion of the elastic pin 15 of the rotational angle restricting member 23, so that the attracting force of the permanent magnets 24 acts on the elastic pin 15. Thus, the N×2N optical fiber switch in accordance with the present invention securely imparts the self-holding force F without constantly energizing the motor.

When the driving force of the drive member 13 is denoted as W, the distal ends of the movable optical fibers 9 are pressed against and brought in close contact with the respective V grooves 3 and 4 by a pressing force of W/2 applied to the movable optical fibers 9 on both sides with the drive member 13 located therebetween. Hence, the optical axes of the movable optical fibers 9 can be precisely aligned with the optical axes of the fixed optical fibers 7 and 8.

According to the results of experiments carried out by the inventor, when a single-mode optical fiber having a diameter of 0.125 mm was supported in the V groove at both ends and when a drive member 13 having a 0.4 mm width was used, the shear fracture load of the single-mode optical fiber was approximately 600 gf.

According to more experiment results, it has been found that, a load of 3 grams or less per optical fiber is sufficient to stably hold the single-mode optical fibers in close contact with the surfaces of the V grooves when a distance S between the fixed optical fibers 7 and 8 is 0.125 mm and a distance L from the support point is 5 mm. Therefore, it has been found that the pressing force W applied to the drive member 13 should be 3 grams or more. This value may be considered to be sufficiently small in comparison with the shear fracture load, which is about 600 gf, of the single-mode optical fiber and also to provide sufficiently high durability against the damage caused by repeated bending.

Figure 4A:
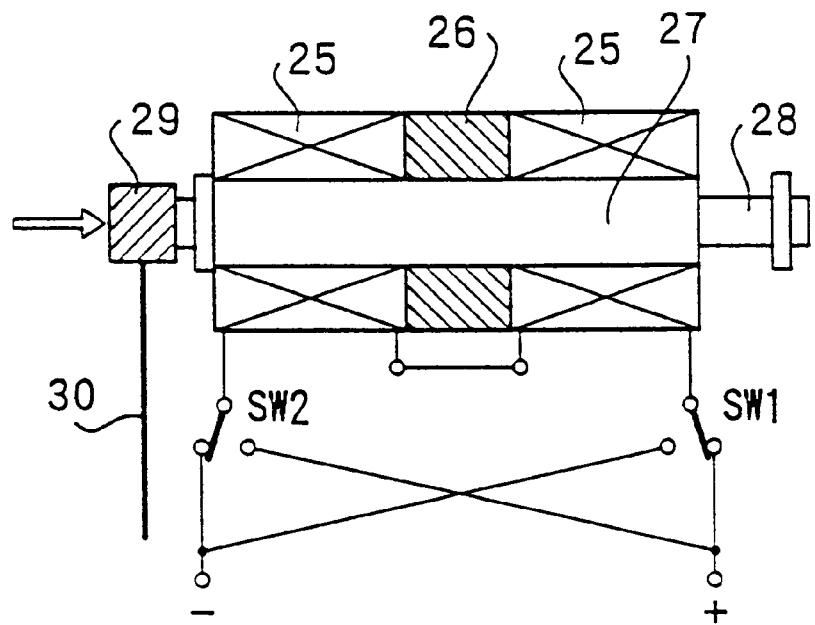
FIG. 4A is a diagram showing an embodiment of another actuator that drives a movable optical fiber.
Figure 4B:
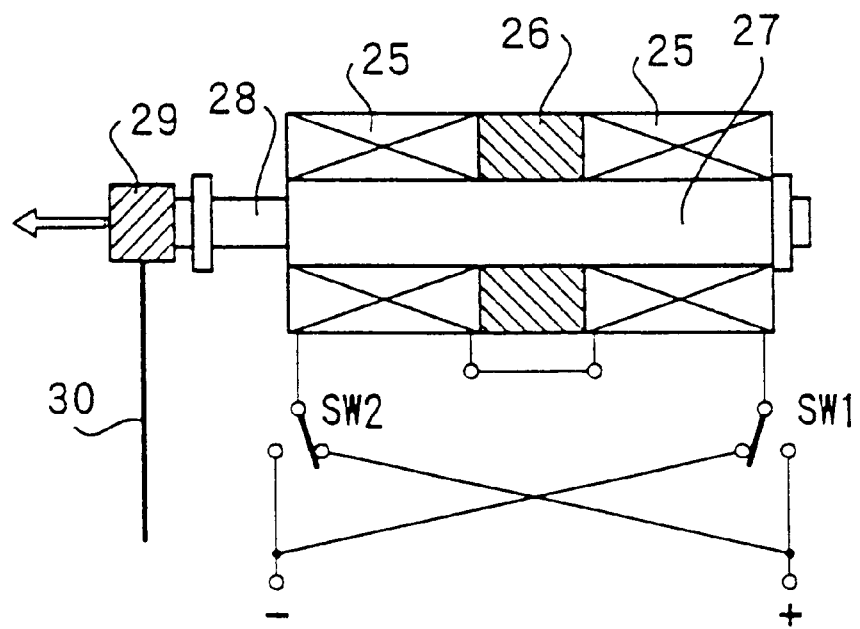
FIG. 4B is a diagram illustrating the embodiment shown in FIG. 4A in another coupling position.

FIGS. 4A and 4B show another embodiment of the actuator. As the actuator, a publicly known self-holding latching solenoid may be used. Provided on both sides of a permanent magnet 26 are solenoid coils 25. A movable shaft 28 is slidably connected to a core 27 composed of a magnetic material.

Switches SW1 and SW2 are alternately turned ON/OFF to supply a pulse current of 0.1 second or less so as to move the movable shaft 28 while switching the axial direction alternately as shown in FIGS. 4A and 4B. This makes it possible to hold the reciprocating end positions without the need of constant supply of current. A bushing 29 is mounted on one end of the movable shaft 28 of the self-holding latching solenoid, and an elastic pin 30 is installed on the bushing 29 at right angles to the shaft as illustrated.

Installing the elastic pin 30 in the same manner as the elastic pin 15 in the slit groove 16 of the drive member 13 makes itself suitably used as the self-holding mechanism for the N×2N optical fiber switch in accordance with the present invention.

Figure 5A:
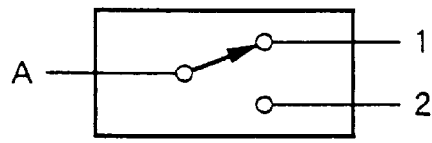
FIG. 5A is a circuit diagram of a 1×2 (N=1) switch.
Figure 5B:
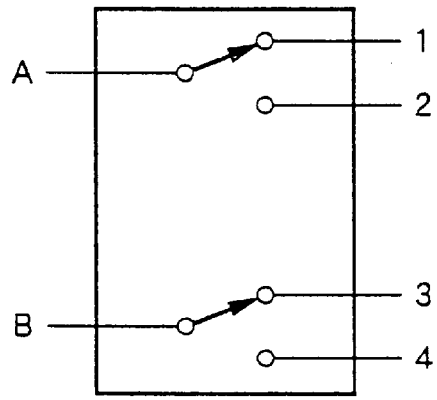
FIG. 5B is a circuit diagram of a 2×4 (N=2) switch.
Figure 5C:
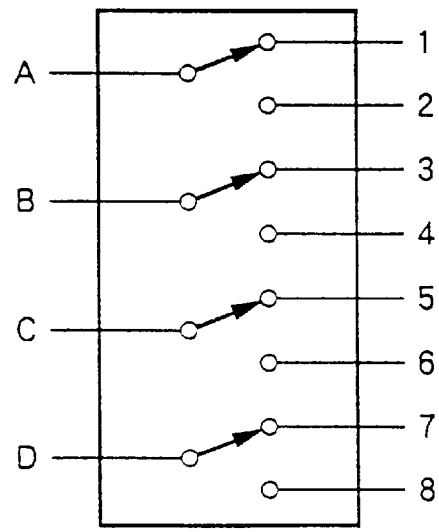
FIG. 5C is a circuit diagram of a 4×8 (N=4) switch.
Figure 6A:
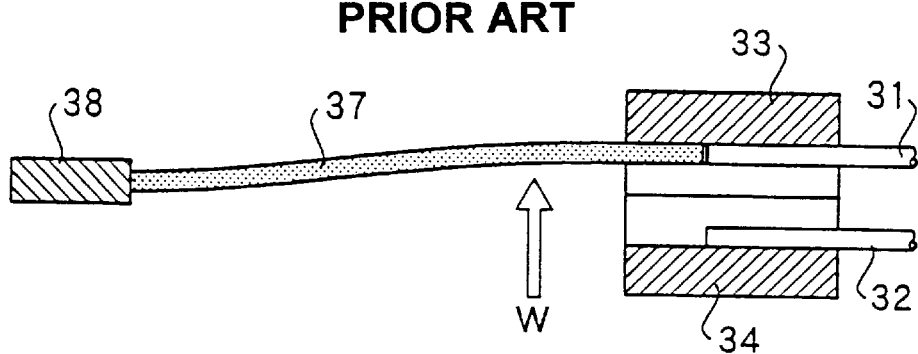
FIG. 6A is a front sectional view illustrative of a first coupling position of a conventional 1×2 switch.
Figure 6B:
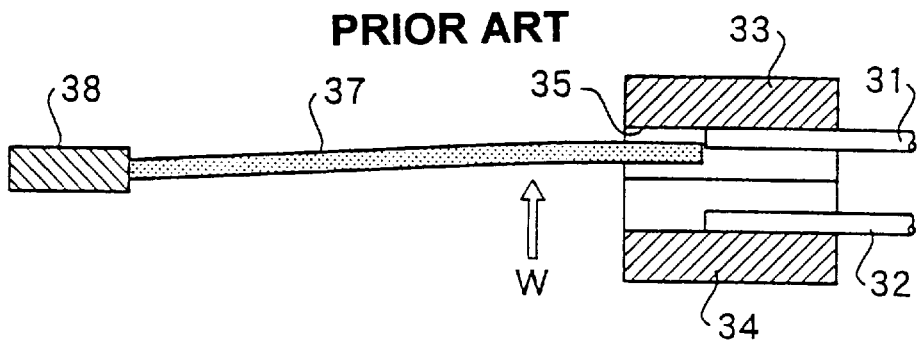
FIG. 6B is a front sectional view illustrative of the switch in an undesirable coupling state.
Figure 6C:
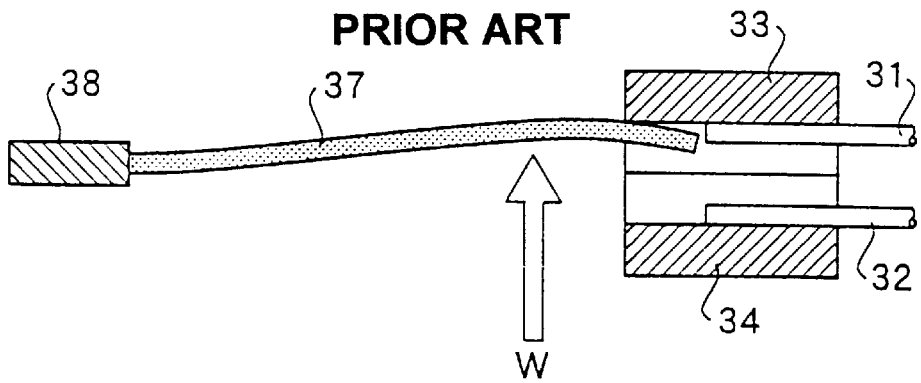
FIG. 6C is a front sectional view illustrative of the switch in another undesirable coupling state.
Figure 6D:
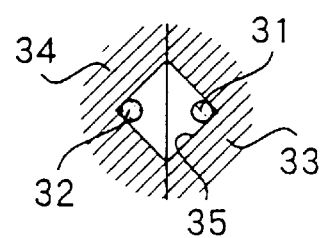
FIG. 6D is a side sectional view illustrative of the relationship between a V groove and an optical fiber of the switch.

FIGS. 5A through 5C are the circuit diagrams showing the switches composed in accordance with the present invention.

FIG. 5A is a circuit diagram showing a 1×2 (N=1) switch; FIG. 5B is a circuit diagram showing a 2×4 (N=2) switch; and FIG. 5C is a circuit diagram showing a 4×8 (N=4) switch.

FIG. 5C illustrates the 4×8 circuit optical fiber switch which is capable of simultaneously switching the connection of four movable optical fibers A, B, C, and D to fixed optical fibers 1, 3, 5, and 7, or 2, 4, 6, and 8. This means a smaller optical fiber switch in comparison with a conventional 4×8 circuit optical fiber switch normally composed of four 1×2 circuit optical fiber switches arranged in parallel. The N×2N optical fiber switch in accordance with the present invention permits easy installation of even multiple circuits such as 16×32 circuits in a single switch main body, thus enabling a considerably smaller design than the conventional one.

Since the N×2N optical fiber switch in accordance with the present invention is constructed as set forth above, the drive member can be driven so as to elastically press the portions in the vicinity of the distal ends of the movable optical fibers against the respective alignment reference surfaces of the first fixed optical fibers and the second fixed optical fibers alternately by a predetermined pressing force.

The actuator further includes the rotational position restricting member for restricting the rotational angle of the motor to a value that exceeds 180 degrees but stays below 270 degrees. By running the motor in the forward or reverse direction within the range specified above, the distal ends of the movable optical fibers can be moved between the first position and the second position. This makes it possible to accurately restrict the coupling positions of the optical axes of the movable optical fibers and the fixed optical fibers.

When the rotational radius of the driving pin of the actuator is denoted as R and the distance between the first position and the second position is denoted as S, the relationship 2R>S is established so as to cause the elastic pin to be flexibly deformed at each rotational position. The elastic force generated by the flexure deformation of the elastic pin and the permanent magnets for attracting the driving pin provided in the rotational angle restricting member make it possible to construct the self-holding optical fiber switch which requires momentary supply of a pulse current only at the time of switching the circuits, thus eliminating the need for constant supply of current.

The N×2N optical fiber switch in accordance with the present invention permits easy installation of even multiple circuits such as 16×32 circuits in a single switch main body. Hence, a considerably smaller design than the conventional N×2N optical fiber switch which typically employs an N number of 1×2 circuit optical fiber switches is achieved.

What is claimed is:

1. An N×2N optical fiber switch comprising:

an alignment member main body which has an N (N≧1) number of pairs of V grooves provided in parallel to a Z-axis direction and aligned in a Y direction and which has a single slit crossing said V grooves in an X direction;

a 2N number of fixed optical fibers disposed in contact with the bottoms of said respective V grooves;

an N number of movable optical fibers which are provided so that the distal ends thereof are opposed to said fixed optical fibers and that they may be in contact with either of pairs of V grooves;

a drive member, which is inserted in said slit, which engages with said N number of movable optical fibers, and which is movably guided in the X direction; and an actuator having an elastic pin extending generally in parallel to the Z-axis direction which engages with said drive member so that it is elastically joined to said drive member to reciprocate said drive member in the X direction in order to cause said N number of movable optical fibers to come in contact with one of said pairs of grooves so as to move them to a first position where they are coupled to one N number of said 2N number of fixed optical fibers, and to cause said N number of movable optical fibers to come in contact with the other of said pairs of grooves so as to move them to a second position where they are coupled to the other N number of said 2N number of fixed optical fibers.

2. An N×2N optical fiber switch according to claim 1, wherein said alignment member main body comprises a first alignment member and a second alignment member which are joined and which are separately provided with a 2N number of V grooves, and the constituent material of said respective alignment members is cemented carbide.

3. An N×2N optical fiber switch according to claim 1, wherein said actuator comprises a motor, and said elastic pin is eccentrically provided on an end surface of a cylindrical member mounted on an distal end of the shaft of said motor, wherein said elastic pin comprises an elastic material and has an extremely small diameter, said elastic pin is inserted in a second slit provided in said drive member, and said drive member is moved forward or backward in the X direction by running said motor in the forward or reverse direction so as to reciprocate said movable optical fibers between said first position and said second position.

4. An N×2N optical fiber switch according to claim 3, wherein said actuator further comprises a rotational position restricting member which restricts a rotational range of said motor defined by a value that exceeds 180 degrees but stays below 270 degrees, and moves the distal ends of said movable optical fibers between said first position and said second position by running said motor in a forward or reverse direction within said rotational range.

5. An N×2N optical fiber switch according to claim 3, wherein, if a rotational radius of an elastic pin of said motor is denoted as R and a distance between said first position and said second position is denoted as S, then a relationship 2R>S is established.

6. An N×2N optical fiber switch according to claim 4, wherein said rotational position restricting member is provided with a permanent magnet for attracting said elastic pin.

7. An N×2N optical fiber switch according to claim 1, wherein said actuator comprises a latching solenoid.

8. An N×2N optical fiber switch according to claim 1, wherein the distal end surfaces of said movable optical fibers and said fixed optical fibers are formed into inclined surfaces of 4 degrees or more with respect to a surface perpendicular to an optical axis.

* * * * *